United States Patent
Huang et al.

(10) Patent No.: US 12,450,035 B2
(45) Date of Patent: Oct. 21, 2025

(54) METHOD AND APPARATUS FOR EXPORTING AND IMPORTING A GROUP NODE

(71) Applicant: BEIJING ZITIAO NETWORK TECHNOLOGY CO., LTD., Beijing (CN)

(72) Inventors: Xiaobo Huang, Beijing (CN); Yuan Xu, Beijing (CN); Weifeng Huang, Beijing (CN); Ruifeng Ma, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 411 days.

(21) Appl. No.: 17/989,795

(22) Filed: Nov. 18, 2022

(65) Prior Publication Data

US 2023/0280984 A1    Sep. 7, 2023

(30) Foreign Application Priority Data

Dec. 17, 2021    (CN) .......................... 202111553700.X

(51) Int. Cl.
    *G06F 8/34*    (2018.01)
(52) U.S. Cl.
    CPC ..................... *G06F 8/34* (2013.01)
(58) Field of Classification Search
    CPC .................................................. G06F 8/34
    See application file for complete search history.

(56) References Cited

U.S. PATENT DOCUMENTS

| | | | |
|---|---|---|---|
| 7,899,820 B2* | 3/2011 | Nagoski | G06F 9/548 707/626 |
| 8,843,884 B1* | 9/2014 | Koerner | G06F 8/34 717/109 |
| 2005/0055355 A1 | 3/2005 | Murthy et al. | |
| 2008/0147720 A1* | 6/2008 | Allerton | G06Q 10/06 |
| 2010/0318556 A1* | 12/2010 | McKay | G06Q 10/10 707/769 |
| 2021/0117807 A1 | 4/2021 | Zhou et al. | |

FOREIGN PATENT DOCUMENTS

| | | |
|---|---|---|
| CN | 107943464 A | 4/2018 |
| CN | 109032599 A | 12/2018 |
| CN | 110688104 A | 1/2020 |
| CN | 111580915 A | 8/2020 |
| CN | 113448678 A | 9/2021 |

* cited by examiner

Primary Examiner — S. Sough
Assistant Examiner — Cheneca Smith

(57) ABSTRACT

Embodiments of the present invention provide a method and apparatus for exporting and importing a group node, which relate to the field of software development technology. The present disclosure enables: receiving an exporting request, where the exporting request is used to request to export a target group node; recursively acquiring nodes in a node group corresponding to the target group node and connection lines between the nodes in the node group; generating a first file according to the target group node, the nodes in the node group, and grouping information of the group nodes in the node group; generating a second file according to connection lines between the nodes in the node group; and outputting a serialized file for the target group node according to the first file and the second file.

13 Claims, 6 Drawing Sheets

METHOD AND APPARATUS FOR EXPORTING AND IMPORTING A GROUP NODE

CROSS REFERENCE TO RELATED APPLICATIONS

This application is based on and claims priority of CN application with application No. 202111553700. X filed on Dec. 17, 2021, the entire disclosure of which is hereby incorporated by reference.

TECHNICAL FIELD

The invention relates to the field of software development technology, in particular to a method and apparatus for exporting and importing a group node.

BACKGROUND

In the process of graphical programming, in order to reduce the complexity brought by the number of nodes and quickly reuse functions implemented by a plurality of nodes, it is often necessary to integrate node groups formed by a plurality of nodes into one group node through a grouping operation, and display the node group in the form of group nodes in a graphical programming interface. This function of combining node groups formed by a plurality of nodes into one group node is referred to as a grouping function.

SUMMARY

The present invention provides a method and apparatus for exporting and importing a group node.

Embodiments of the present invention provide following technical solutions:

In a first aspect, an embodiment of the present invention provides a method for exporting a group node, comprises:
  receiving an exporting request, where the exporting request is used to request to export a target group node;
  recursively acquiring nodes in a node group corresponding to the target group node and connection lines between the nodes in the node group;
  generating a first file according to the target group node, the nodes in the node group, and grouping information of the group nodes in the node group;
  generating a second file according to connection lines between the nodes in the node group;
  outputting a serialized file for the target group node according to the first file and the second file.

As an optional implementation of the embodiment of the present invention, the generating a first file according to the target group node, the nodes in the node group, and grouping information of the group nodes in the node group comprises:
  constructing the node tree according to the target group node, the nodes in the node group and the grouping information of the group nodes in the node group; wherein the root node of the node tree is the target group node, other nodes of the node tree are the nodes in the node group respectively, and any group node is a parent node of nodes in a node group corresponding to the group node;
  generating the first file according to the node tree.

As an optional implementation of the embodiment of the present invention, the generating the first file according to the node tree comprises:
  serializing nodes of the node tree to generate serialized files for the nodes of the node tree;
  saving the serialized file for the root node of the node tree as a root file for the first file, and saving the serialized files for child nodes of the node tree level by level as child files for the serialized file for the parent node.

As an optional implementation of the embodiment of the present invention, the generating the second file according to the connection lines between the nodes in the node group comprises:
  acquiring ports corresponding to individual connection lines, ports corresponding to any connection line including ports connected to both ends of the connection line;
  serializing the ports corresponding to individual connection lines to generate serialized files for individual connection lines;
  generating the second file according to the serialized files for individual connection lines.

In a second aspect, an embodiment of the present invention provides a method for importing a group node, comprises:
  receiving an importing request, where the importing request is used to request to import a target group node;
  acquiring a serialized file for the target group node, the serialized file for the target group node including: a first file and a second file;
  parsing the first file to acquire the target group node, nodes in a node group corresponding to the target group node, and grouping information of group nodes in the node group;
  parsing the second file to acquire connection lines between nodes in the node group;
  constructing the target group node and the node group corresponding to the target group node according to the target group node, the nodes in the node group, the grouping information of the group nodes in the node group and the connection lines between the nodes in the node group.

As an optional implementation of the embodiment of the present invention, the parsing the first file to acquire the target group node, nodes in a node group corresponding to the target group node, and grouping information of group nodes in the node group comprises: parsing the first file to acquire a node tree;
  acquiring the target group node according to the root node of the node tree;
  acquiring nodes in the node group according to other nodes in the node tree;
  acquiring the grouping information of the group nodes in the node group according to the parent-child relationships between the nodes of the node tree.

As an optional implementation of the embodiment of the present invention, the parsing the first file to acquire a node tree comprises:
  parsing the first file to acquire serialized files for individual nodes;
  de-serializing the serialized files for individual nodes to generate nodes corresponding to individual serialized files;
  saving a node corresponding to the root file for the first file as the root node of the node tree, and saving nodes corresponding to child files for the first file level by level as child nodes of the node corresponding to the parent file.

As an optional implementation of the embodiment of the present invention, the parsing the second file to acquire connection lines between nodes in the node group comprises:

parsing the second file to acquire serialized files for individual connection lines;

de-serializing the serialized files for individual connection lines to generate ports corresponding to the connection lines; wherein ports corresponding to any connection line includes ports connected to both ends of the connection line.

In a third aspect, an embodiment of the present invention provides an apparatus for exporting a group node, comprising:

a receiving unit configured to receive an exporting request, where the exporting request is used to request to export a target group node;

an acquisition unit configured to recursively acquire nodes in a node group corresponding to the target group node and connection lines between the nodes in the node group;

a node processing unit configured to generate a first file according to the target group node, the nodes in the node group, and grouping information of the group nodes in the node group;

a connection processing unit configured to generate a second file according to connection lines between the nodes in the node group;

an output unit configured to output a serialized file for the target group node according to the first file and the second file.

As an optional implementation of the embodiment of the present invention, the node processing unit is specifically configured to construct the node tree according to the target group node, the nodes in the node group and the grouping information the group nodes in the node group, and generate the first file according to the node tree;

Wherein, the root node of the node tree is the target group node, other nodes of the node tree are the nodes in the node group respectively, and any group node is a parent node of nodes in a node group corresponding to the group node;

As an optional implementation of the embodiment of the present invention, the node processing unit is specifically configured to serialize nodes of the node tree to generate serialized files for the nodes of the node tree; save the serialized file for the root node of the node tree as a root file for the first file, and save the serialized file for child nodes of the node tree level by level as child files for the serialized file for the parent node.

As an optional implementation of the embodiment of the present invention, the connection processing unit is specifically configured to acquire ports corresponding to individual connection lines, and ports corresponding to any connection line including ports connected to both ends of the connection line; serialize the ports corresponding to individual connection lines to generate serialized files for individual connection lines; generate the second file according to the serialized files for individual connection lines.

In a fourth aspect, an embodiment of the present invention provides an apparatus for importing a group node, comprises:

a receiving unit configured to receive an importing request, where the importing request is used to request to import a target group node;

an acquisition unit configured to acquire a serialized file for the target group node, the serialized file for the target group node including: a first file and a second file;

a node parsing unit configured to parse the first file to acquire the target group node, nodes in a node group corresponding to the target group node, and grouping information of group nodes in the node group;

a connection parsing unit configured to parse the second file to acquire connection lines between nodes in the node group;

a generating unit configured to construct the target group node and the node group corresponding to the target group node according to the target group node, the nodes in the node group, the grouping information of the group nodes in the node group and the connection lines between the nodes in the node group.

As an optional implementation of the embodiment of the present invention, the node parsing unit is specifically configured to parse the first file to acquire a node tree; acquire the target group node according to the root node of the node tree; acquire nodes in the node group according to other nodes in the node tree; acquire the grouping information of the group nodes in the node group according to the parent-child relationships between the nodes of the node tree.

As an optional implementation of the embodiment of the present invention, the node parsing unit is specifically configured to parse the first file to acquire serialized files for individual nodes; de-serialize the serialized files for individual nodes to generate nodes corresponding to individual serialized files; save a node corresponding to the root file for the first file as the root node of the node tree, and save nodes corresponding to child files for the first file level by level as child nodes of the node corresponding to the parent file.

As an optional implementation of the embodiment of the present invention, the connection parsing unit is specifically configured to parse the second file to acquire serialized files for individual connection lines, and de-serialize the serialized files for individual connection lines to generate ports corresponding to individual connection lines;

wherein ports corresponding to any connection line includes ports connected to both ends of the connection line.

In a fifth aspect, an embodiment of the present invention provides an electronic device, comprising: a memory and a processor, where the memory is configured to store a computer program; the processor is configured to, when the computer program is invoked, cause the electronic device to implement the method of any of above embodiments.

In a sixth aspect, an embodiment of the present invention provides a computer-readable storage medium, which, when the computer program is executed by a computing device, causes the computing device to implement the method of any of above embodiments.

In a seventh aspect, an embodiment of the present invention provides a computer program product, which, when runs on a computer, causes the computer to implement the method of any of above embodiments.

When an exporting request for requesting to export a target group node is received, the method for exporting a group node provided by an embodiment of the present invention first recursively acquires nodes in a node group corresponding to the target group node and connection lines between nodes in the node group, and then generates a first file according to the target group node, the nodes in the node group, and grouping information of the group nodes in the node group, and generates a second file according to connection lines between the nodes in the node group, and finally outputs a serialized file for the target group node according to the first file and the second file. Since the serialized file for the target group node comprises: the first file and the second file, and the first file is generated according to the target group node, the nodes in the node group and the grouping information of the group nodes in the node group, and the second file is generated according to the connection lines between the nodes in the node group, the target group node and the node group corresponding to the target group node can be reconstructed according to the serialized file for the target group node.

BRIEF DESCRIPTION OF THE DRAWINGS

The accompanying drawings, which are incorporated in and constitute a part of this specification, illustrate embodiments consistent with the present invention and serve to explain principles of the invention together with the specification.

In order to more clearly illustrate technical solutions in the embodiments of the present invention or the related technique, the accompanying drawings that need to be used in the description of the embodiments or the related technique will be introduced briefly follow. Apparently, for those of ordinary skilled in the art, other drawings can also be obtained from these drawings without any creative effort.

DETAILED DESCRIPTION

In order to more clearly understand above objects, features and advantages of the present invention, the solution of the present invention will be further described below. It should be noted that embodiments of the present invention and features in the embodiments may be combined with each other without conflict.

Many specific details are set forth in the following description to facilitate a full understanding of the present invention, but the present invention can also be implemented in other ways different from those described herein; obviously, the embodiments in the specification are only a part, not all, of embodiments of the present invention.

It should be noted that, in order to clearly describe the technical solutions of the embodiments of the present invention, in the embodiments of the present invention, words such as "first" and "second" are used to distinguish between the same or similar items that have basically the same function and effect and those skilled in the art can understand that words such as "first" and "second" do not have limitations on the quantity and execution order. For example, a first feature image set and a second feature image set are only for distinguishing between different feature image sets, rather than limiting sequences of the feature image sets and so on.

In the embodiments of the present invention, words such as "exemplary" or "for example" are used to mean serving as an example, exemplification or illustration. Any embodiments or design solutions described as "exemplary" or "for example" in the embodiments of the present invention should not be construed as preferred or advantageous over other embodiments or design solutions. More exactly, the use of words such as "exemplary" or "such as" is intended to present related concepts in a specific manner. In addition, in the description of the embodiments of the present invention, the meaning of "a plurality of" refers to two or more, unless otherwise specified.

Although integrating a stage group formed by a plurality of nodes into one group node through a grouping function may reduce the complexity brought by the number of nodes greatly and quickly reuse the group node, but group nodes in the related technique can only be reused in current project, and cannot be stored as an independent file or related resources and migrated into other projects for reuse. This not only significantly limits usage space for grouping functions and group nodes, but also hinders communication and sharing among users.

Figure 1:
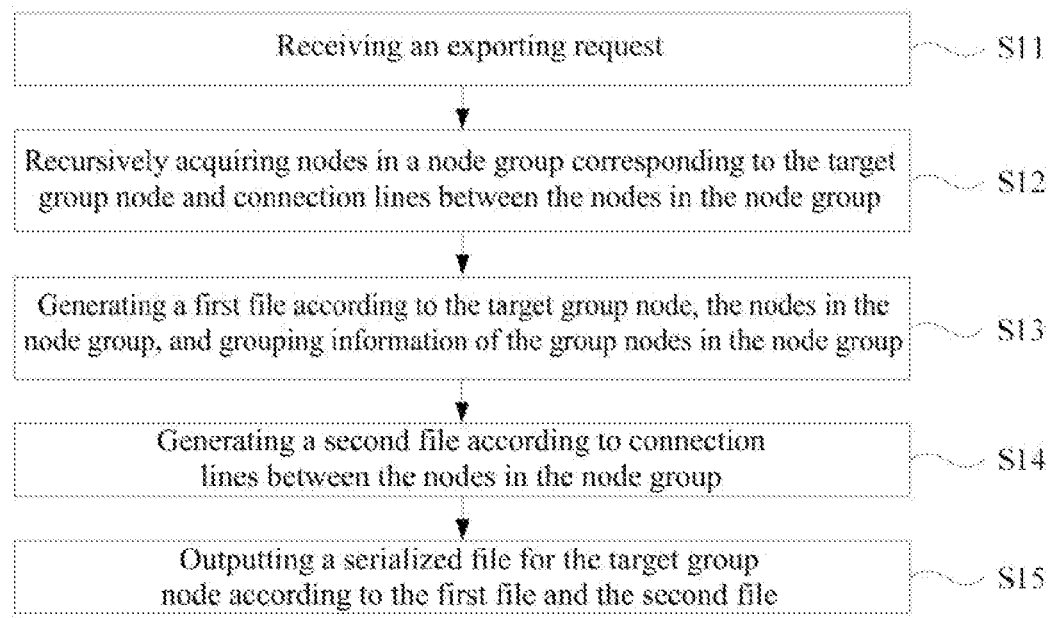
FIG. 1 is a flowchart of steps of a method for exporting a group node provided by an embodiment of the present invention.

An embodiment of the present invention provides a method for exporting a group node. Referring to FIG. 1, the method for exporting a group node provided by an embodiment of the present invention comprises following steps:

S11. Receiving an exporting request.

Wherein, the exporting request is used to request to export a target group node.

Figure 2:
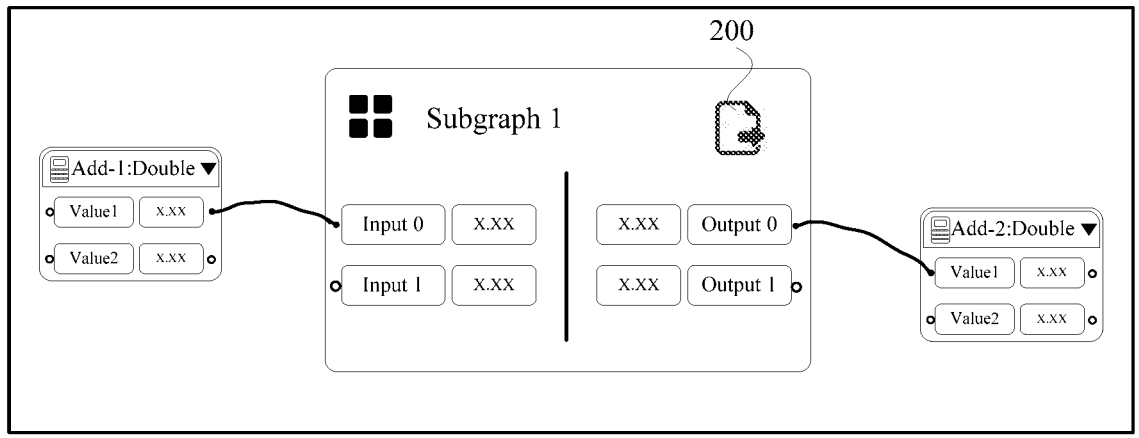
FIG. 2 is a scenario interface diagram of an input exporting request provided by an embodiment of the present invention.

Exemplarily, as shown in FIG. 2, an implementation of receiving an importing request may include: displaying an identifier 200 for triggering the export of a corresponding group node on a group node, and when receiving an operation by a user on the identifier 200 displayed on a certain group node, determining that an exporting request for requesting to export the group node is received.

S12. Recursively acquiring nodes in a node group corresponding to the target group node and connection lines between the nodes in the node group.

In the embodiments of the present invention, a node group corresponding to a target group node refers to a node group represented by the target group node. For example, if a group node A is obtained by performing a grouping operation on a node group 1, then the node group corresponding to the group node A is the node group 1.

Further, recursively acquiring nodes in a node group corresponding to the target group node refers to first acquiring individual nodes forming the node group corresponding to the target group node, and then determining whether there are group nodes in nodes forming the node group corresponding to the target group node, if there are group nodes in the nodes forming the node group corresponding to the target group node, further acquiring nodes in node groups corresponding to the group nodes until nodes that form the node group corresponding to each group node are acquired. For example, nodes forming the node group corresponding to the target group node include: node A, node B and node C, and node B is a group node, and nodes forming the node group corresponding to node B include: node D, node E And node F, and acquiring result of recursively acquiring nodes in the node group corresponding to the target group node comprises: A, node B, node C, node D, node E and node F, not just including node A, node B and node C.

Figure 3:
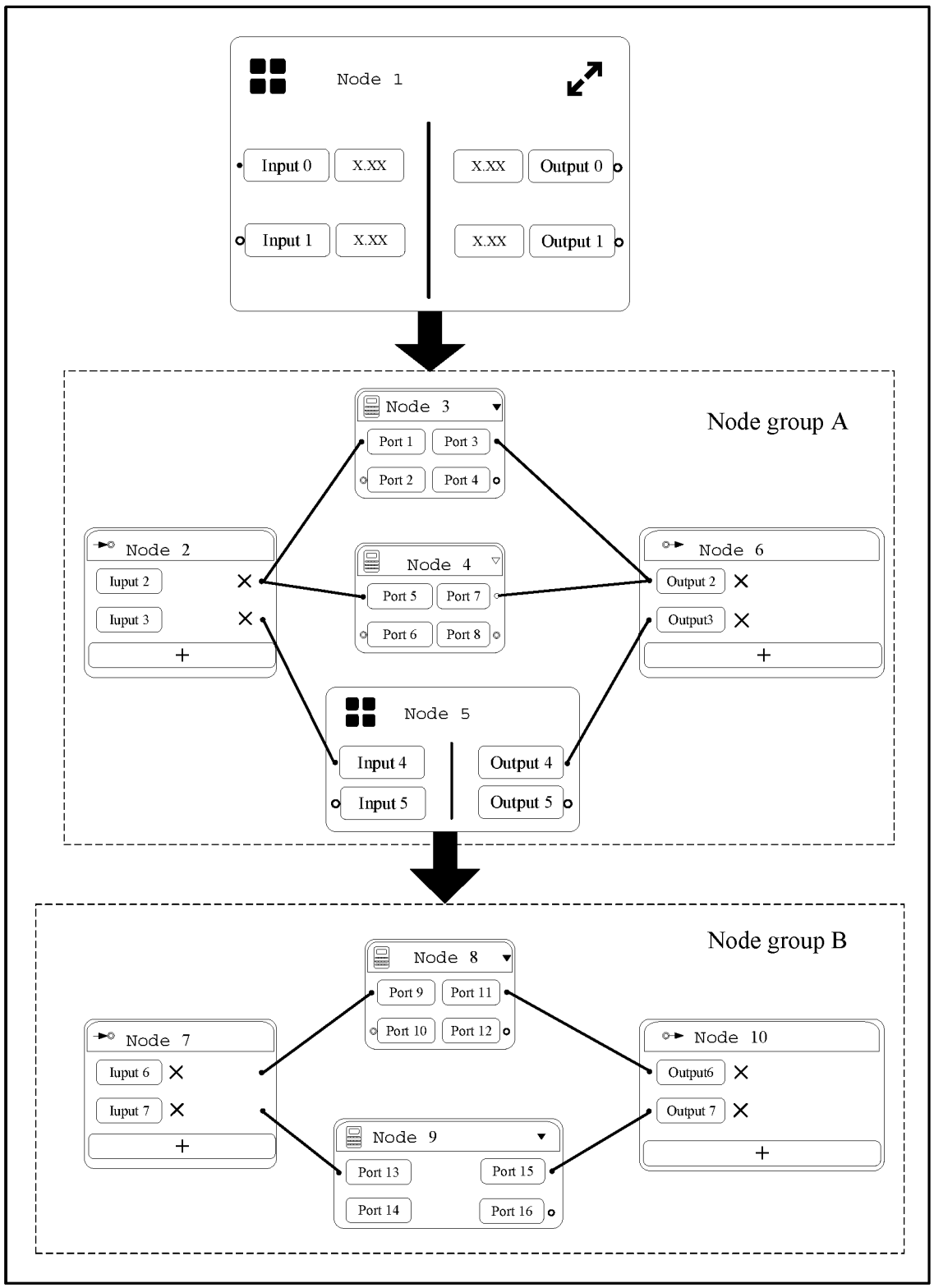
FIG. 3 is a schematic diagram of a node group provided by an embodiment of the present invention.

Exemplarily, referring to FIG. 3, as shown in FIG. 3, taking node 1 being a group node (target group node) intended to be exported, the node group corresponding to node 1 being node group A, and nodes in group node group A including: node 2, node 3, node 4, node 5, node 6, the node 5 in the nodes of the group node group A being the group node, the node group corresponding to the node 5 being the node group B, and nodes in the group node group B including: node 7, node 8, node 9, and node 10 as an example to describe the embodiment of the present invention.

Recursively acquiring nodes in the node group (node group A) corresponding to the target group node (node 1), then the acquired nodes include: node 2, node 3, node 4, node 5, node 6, node 7, node 8, node 9, node 10. The connection lines between node 2, node 3, node 4, node 5, node 6, node 7, node 8, node 9, and node 10 comprises: the connection line between Input2 of node 2 and port 1 of node 3; the connection line between Input2 of node 2 and port 5 of node 4; the connection line between Input3 of node 2 and Input4 of node 5; the connection line between port 3 of node 3 and Output2 of node 6; the connection line between port 7 of node 4 and Output3 of node 6; the connection line between port Input4 of node 5 and Output3 of node 6; the connection line between Input6 of node 7 and port 9 of node 8; the connection line between Input7 of node 8 and port 13 of node 9; the connection line between port 11 of node 8 and Output6 of node 10; and the connection line between port 15 of node 9 and Output7 of node 10.

S13. Generating a first file according to the target group node, the nodes in the node group, and grouping information of the group nodes in the node group.

That is, the first file includes three types of information, namely:
1. the target group node;
2. nodes in the node group corresponding to the target group node acquired recursively;
3. The grouping information of the group nodes in the node group.

In the embodiment of the present invention, the grouping information of the group nodes in the node group is used to describe the correspondence between the group nodes in the node group and the node group formed by the nodes. For example: in the example shown in FIG. 3, the node group includes one group node (node 5), so it includes one grouping information, and the group information is specifically: the node group formed by node 7, node 8, node 9, node 10 being the node group corresponding to node 5.

Following the example shown in FIG. 3, the nodes acquired when recursively acquiring the nodes in the node group (node group A) corresponding to the target group node (node 1) include: node 2, node 3, node 4, node 5, node 6, node 7, node 8, node 9, node 10.

The connection lines between node 2, node 3, node 4, node 5, node 6, node 7, node 8, node 9, and node 10 comprises: the connection line between Input2 of node 2 and port 1 of node 3; the connection line between Input2 of node 2 and port 5 of node 4; the connection line between Input3 of node 2 and Input4 of node 5; the connection line between port 3 of node 3 and Output2 of node 6; the connection line between port 7 of node 4 and Output3 of node 6; the connection line between port Input4 of node 5 and Output3 of node 6; the connection line between Input6 of node 7 and port 9 of node 8; the connection line between Input7 of node 8 and port 13 of node 9; the connection line between port 11 of node 8 and Output6 of node 10; and the connection line between port 15 of node 9 and Output7 of node 10.

The grouping information of node 2, node 3, node 4, node 5, node 6, node 7, node 8, node 9, and node 10 comprises: the node group formed by node 7, node 8, node 9, and node 10 being the node group corresponding to node 5.

Therefore, when an exporting request requesting to export node 1 is received, the first file is generated according to above information.

It should be noted that the embodiment of the present invention does not limit the implementation of generating the first file according to the target group node, individual nodes in the node group, and the grouping information of individual group nodes in the node group, so that after the first file is generated according to the target group node, individual nodes in the node group, and the grouping information of individual group nodes in the node group, the target group node, individual nodes in the node group, and the grouping information of individual group nodes in the node group can be parsed according to the first file.

S14. Generating a second file according to connection lines between the nodes in the node group.

Exemplarily, as shown in FIG. 3, connection lines between individual nodes (node 2, node 3, node 4, node 5, node 6, node 7, node 8, node 9, nodes 10) in the node group (node group A) comprises:

the connection line between Input2 of node 2 and port 1 of node 3;
the connection line between Input2 of node 2 and port 5 of node 4;
the connection line between Input3 of node 2 and Input4 of node 5;
the connection line between port 3 of node 3 and Output2 of node 6;
the connection line between port 7 of node 4 and Output3 of node 6;
the connection line between the port Input4 of node 5 and the Output3 of node 6;
the connection line between Input6 of node 7 and port 9 of node 8;
the connection line between Input7 of node 8 and port 13 of node 9;
the connection line between port 11 of node 8 and Output6 of node 10;
the connection line between port 15 of node 9 and Output7 of node 10.

Therefore, when an exporting request requesting to export node 1 is received, the second file is generated according to above connection lines.

Similarly, the embodiment of the present invention does not limit the specific implementation of generating the second file according to connection lines between the nodes in the node group, so that after the second file is generated according to the connection lines between the nodes in the node group, the connection lines between the nodes in the node group can be parsed according to the second file.

It should also be noted that the embodiment of the present invention does not limit the execution order of above steps S13 and S14. The step S13 may be executed first, and then the step S14 is executed, or the step S14 may be executed first and then the step 13 is executed, or the step S13 and step S14 may be executed simultaneously.

S15. Outputting a serialized file for the target group node according to the first file and the second file.

Optionally, the implementation of above step S15 (outputting a serialized file for the target group node according to the first file and the second file) may comprise:

combining the first file and the second file to acquire and output a serialized file for the target group node.

Optionally, the suffix file name of the serialized file for the target group node may be: .subgraph. For example: the file name of the serialized file for node 1 may be "node 1.subgraph".

When an exporting request for requesting to export a target group node is received, the method for exporting a group node provided by an embodiment of the present invention first recursively acquires nodes in a node group corresponding to the target group node and connection lines between nodes in the node group, and then generates a first file according to the target group node, the nodes in the node group, and grouping information of the group nodes in the node group, and generates a second file according to connection lines between the nodes in the node group, and finally outputs a serialized file for the target group node according to the first file and the second file. Since the serialized file for the target group node comprises: the first file and the second file, and the first file is generated according to the target group node, the nodes in the node group and the grouping information of the group nodes in the node group, and the second file is generated according to the connection lines between the nodes in the node group, the target group node and the node group corresponding to the target group node can be reconstructed according to the serialized file for the target group node, therefore, by importing the serialized file for the target group node into other projects, the embodiment of the present invention can implement the reuse of the group node in the other projects.

An application scenario of the method for exporting a group node provided by an embodiment of the present invention comprises: in the process of editing a special effect, a raining effect is realized by means of node-based visual programming, and a group node for realizing the rain effect is the group node A, then the group node A can be used as a target group node in the embodiment of the present invention, and a serialized file for the group node A can be acquired through the method for exporting a group node provided by the embodiment of the present invention. When the raining effect need to be realized also in subsequent other special effects, an editor for special effects can realize the raining effect by importing the serialized file for group node A without implementing it again with the special effect editing method. It should be noted that, in above scenario embodiment, taking the special effect implemented by the target group node being the raining effect as an example for description, but the embodiment of the present invention is not limited to this, and the target group node in the embodiment of the present invention may be a group node for realizing any special effect. For example, the target group node can also be a group node that realizes snow effect, a group node that realizes flame effect, or a group node that realizes automatic beauty effect, etc.

As an optional implementation of the embodiment of the present invention, one implementation of above step S13 (generating a first file according to the target group node, the nodes in the node group, and the grouping information of the group nodes in the node group) comprises following steps a and b:

Step a. Constructing the node tree according to the target group node, the nodes in the node group, and the grouping information of the group nodes in the node group.

Wherein, the root node of the node tree is the target group node, other nodes of the node tree are the nodes in the node group respectively, and any group node is a parent node of nodes in a node group corresponding to the group node.

Figure 4:
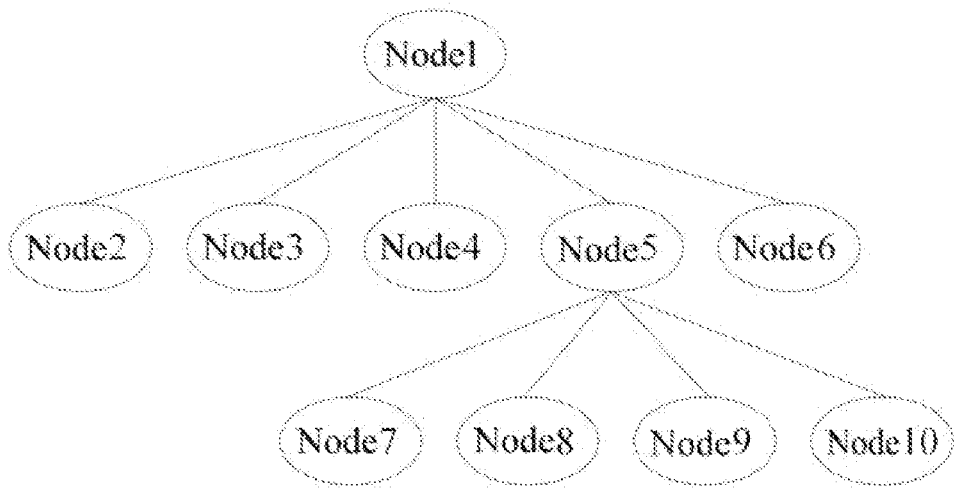
FIG. 4 is a schematic structural diagram of a node tree provided by an embodiment of the present invention.

Following the example shown in FIG. 3, the node tree constructed according to the target group node, individual nodes in the node group, and grouping information of individual group nodes in the node group may be shown in FIG. 4. As shown in FIG. 4, node 1 is the root node of the node tree, and other nodes of the node tree are node 2, node 3, node 4, node 5, node 6, node 7, node 8, node 9, and node 10. Group node 1 is the parent node of individual nodes (node 2, node 3, node 4, node 5, node 6) in node group A, and group node 5 is the parent node of individual nodes (node 7, node 8, node 9, node 10) in node group B.

Step b. Generating the first file according to the node tree.

Optionally, the implementation of above step b (generating the first file according to the node tree) may include following steps 1 and 2:

Step 1. Serializing nodes of the node tree to generate a serialized file for the nodes of the node tree.

Step 2. Saving the serialized file for the root node of the node tree as a root file for the first file, and saving the serialized files for child nodes of the node tree level by level as child files for the serialized file for the parent node.

Figure 5:
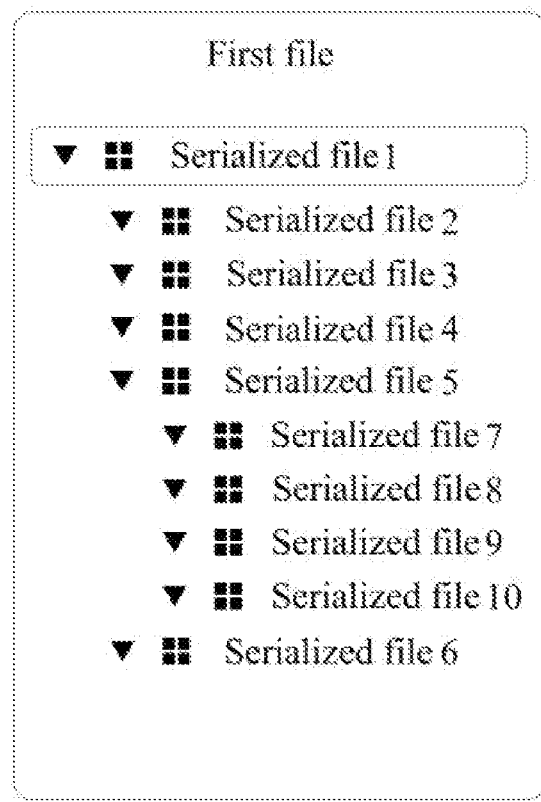
FIG. 5 is a schematic structural diagram of a first file provided by an embodiment of the present invention.
Figure 6:
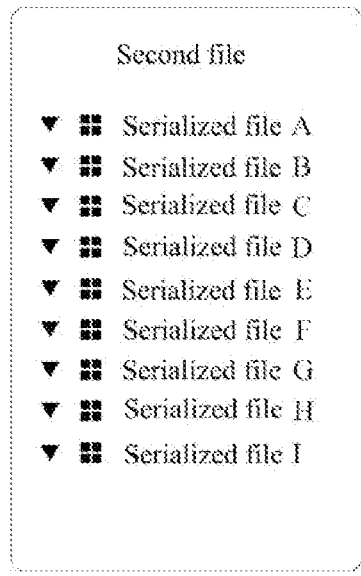
FIG. 6 is a schematic structural diagram of a second file provided by an embodiment of the present invention.

Following the node tree shown in FIG. 4 above, serializing nodes of the node tree to generate a serialized file for the nodes of the node tree, and saving the serialized file for the root node of the node tree as a root file for the first file, and saving the serialized files for child nodes of the node tree level by level as child files for the serialized file for the parent node, the acquired first file may be as shown in FIG. 5. Wherein, serialized files 1-10 are the serialized files for nodes 1-10 respectively, serialized file 1 is the root file for the first file, serialized file 1 is the parent file for serialized files 2-6, and serialized file 5 is the parent file for serialized files 7-10.

As an optional implementation of the embodiment of the present invention, above step S14 (generating the second file according to connection lines between nodes in the node group) comprises following steps I-III:

Step I. Acquiring ports corresponding to individual connection lines.

Wherein, ports corresponding to any connection line including ports connected to both ends of the connection line.

Following the example shown in FIG. 3, the connection lines between individual nodes forming the node group corresponding to node 1 include:

the connection line between Input2 of node 2 and port 1 of node 3;

the connection line between Input2 of node 2 and port 5 of node 4;

the connection line between Input3 of node 2 and Input4 of node 5;

the connection line between port 3 of node 3 and Output2 of node 6;

the connection line between port 7 of node 4 and Output3 of node 6;

the connection line between the port Input4 of node 5 and the Output3 of node 6;

the connection line between Input6 of node 7 and port 9 of node 8;

the connection line between Input7 of node 8 and port 13 of node 9;

the connection line between port 11 of node 8 and Output6 of node 10;

The connection line between port 15 of node 9 and Output7 of node 10.

So there are:

The ports corresponding to the connection line between Input2 of node 2 and port 1 of node 3 are: Input2, port 1;

The ports corresponding to the connection line between Input2 of node 2 and port 5 of node 4 are: Input2, port 5;

The ports corresponding to the connection line between Input3 of node 2 and Input4 of node 5 are: Input3, Input4;

The ports corresponding to the connection line between port 3 of node 3 and Output2 of node 6 are: port 3, Output2;

The ports corresponding to the connection line between port 7 of node 4 and Output3 of node 6 are: port 7, Output3;

The ports corresponding to the connection line between port Input4 of node 5 and Output3 of node 6 are: Input4, Output3;

The ports corresponding to the connection line between Input6 of node 7 and port 9 of node 8 are: Input6, port 9;

The ports corresponding to the connection line between Input7 of node 8 and port 13 of node 9 are: Input7, port 13;

The ports corresponding to the connection line between port 11 of node 8 and Output6 of the node 10 are: port 11, Output6;

The ports corresponding to the connection line between port 15 of node 9 and Output7 of node 10 are: port 15 and Output7.

Step II. Serializing the ports corresponding to the connection lines to generate serialized files for the connection lines.

Step III. Generating the second file according to the serialized files for the connection lines.

Figure 7:
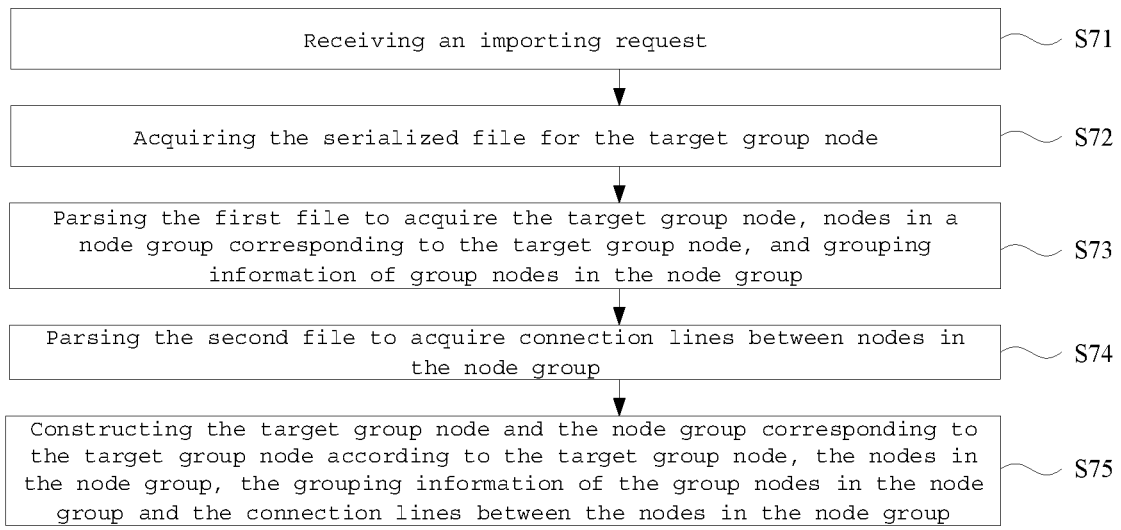
FIG. 7 is a flowchart of steps of a method for importing a group node provided by an embodiment of the present invention.

Following previous embodiment, generating the second file according to the serialized files for the connection relationships may be as shown in FIG. 7. Wherein, the second file comprises: serialized file A-serialized file I; wherein, serialized file A is a file obtained by serializing Input1 and port 1, serialized file B is a file obtained by serializing Input2 and port 5, serialized file C is a file obtained by serializing Input3 and Input4, serialized file D is a file obtained by serializing port 3 and Output2, serialized file E is a file obtained by serializing port 7 and Output3, serialized file F is a file obtained by serializing Input4 and Output3, serialized file G is a file obtained by serializing Input6 and port 9, serialized file H is a file obtained by serializing port 11 and Output6, and serialized file I is a file obtained by serializing port 15 and Output7.

Another embodiment of the present invention provides a method for importing a group node. Referring to FIG. 7, the method for importing a group node comprises following steps: S71. Receiving an importing request.

Wherein, the importing request is used to request to import a target group node.

Figure 8:
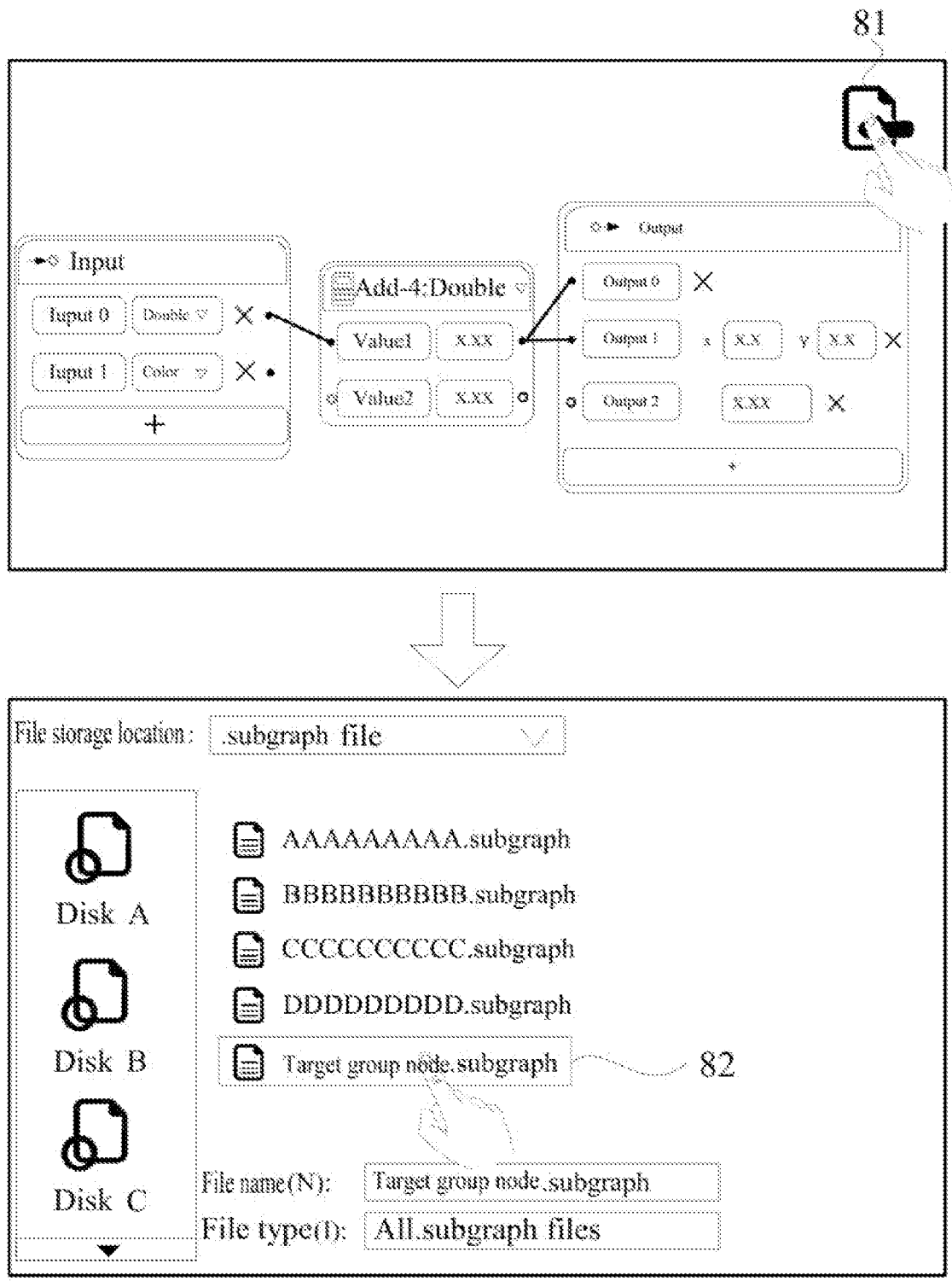
FIG. 8 is a scenario interface diagram of an input importing request provided by an embodiment of the present invention.

Exemplarily, as shown in FIG. 8, an implementation of receiving an importing request may include: displaying an identifier 81 for triggering the import of a group node in a node-based visual programming interface; when receiving an operation on the identifier 81 by a user, prompting to jump to a file preview interface, and prompting the user to select group nodes to be imported; when receiving a selection input for a serialized file 82 for a certain group node by the user, determining that an importing request for importing the group node has been received.

S72. Acquiring the serialized file for the target group node.

Wherein, the serialized file for the target group node comprises: a first file and a second file.

S73. Parsing the first file to acquire the target group node, nodes in a node group corresponding to the target group node, and grouping information of group nodes in the node group.

As an optional implementation of the embodiment of the present invention, above step S73 (parsing the first file to acquire the target group node, nodes in a node group corresponding to the target group node, and grouping information of group nodes in the node group) comprises following steps a to d:

Step a: Parsing the first file to acquire a node tree.

Optionally, above step a (parsing the first file to acquire a node tree) comprises following steps 1 to 3:

Step 1. Parsing the first file to acquire serialized files for individual nodes.

Step 2: De-serializing the serialized files for individual nodes to generate nodes corresponding to individual serialized files.

Step 3. Saving the node corresponding to the root file for the first file as the root node of the node tree, and saving nodes corresponding to child files for the first file level by level as child nodes of the node corresponding to the parent file.

Step b. Acquiring the target group node according to the root node of the node tree.

Step c. Acquiring nodes in the node group according to other nodes in the node tree.

Step d. Acquiring grouping information of group nodes in the node group according to the parent-child relationships between nodes of the node tree.

S74. Parsing the second file to acquire connection lines between nodes in the node group.

As an optional implementation of the embodiment of the present invention, above step S74 (parsing the second file to acquire connection lines between nodes in the node group) comprises following steps I and II:

Step I. Parsing the second file to acquire the serialized files for individual connection lines.

Step II. De-serializing the serialized files for individual connection lines to generate ports corresponding to individual connection lines.

Wherein, ports corresponding to any connection line includes ports connected to both ends of the connection line.

S75. Constructing the target group node and the node group corresponding to the target group node according to the target group node, the nodes in the node group, the grouping information of the group nodes in the node group and the connection lines between the nodes in the node group.

In the method for importing a group node provided by the embodiments of the present invention, when receiving an importing request for requesting to import a target group node obtained by performing grouping operations on target node groups, first acquiring a serialized file for the target group node, and then parsing the first file to acquire the target group node, the nodes in the node group, and the grouping information of the group nodes in the node group, and parsing the second file to acquire the connection lines between the nodes in the node group, and finally constructing the target group node and the node group corresponding to the target group node according to the target group node, the nodes in the node group, the grouping information of the group nodes in the node group and the connection lines between the nodes in the node group. Since the method for importing a group node provided by the embodiment of the present invention can reconstruct the target group node and the target node group based on the serialized file for the target group node, the embodiment of the present invention can realize the reuse of the group node in other projects by reconstructing the target group node and the node group corresponding to the target group node through the serialized file for the target group node in the other projects. Based on the same inventive concept, as an implementation of above method, an embodiment of the present invention further provides an apparatus for exporting a group node and an apparatus for importing a group node. The apparatus embodiments correspond to the foregoing method embodiments. For ease of reading, The apparatus embodiments will not repeat details in the foregoing method embodiments one by one, but it should be clear that the apparatus for exporting a group node and the apparatus for importing a group node in the embodiments can correspondingly implement all the content in the foregoing method embodiments.

Figure 9:
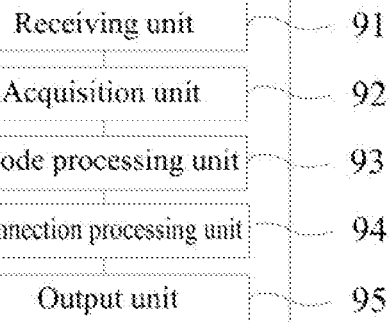
FIG. 9 is a schematic structural diagram of an apparatus for exporting a group node provided by an embodiment of the present invention.

An embodiment of the present invention provides an apparatus for editing group nodes. FIG. 9 is a schematic structural diagram of the apparatus for exporting a group node. As shown in FIG. 9, the apparatus for exporting a group node 900 comprises:
- a receiving unit 91 configured to receive an exporting request, where the exporting request is used to request to export a target group node;
- an acquisition unit 92 configured to recursively acquire nodes in a node group corresponding to the target group node and connection lines between the nodes in the node group;
- a node processing unit 93 configured to generate a first file according to the target group node, the nodes in the node group, and grouping information of the group nodes in the node group;
- a connection processing unit 94 configured to generate a second file according to connection lines between the nodes in the node group;
- an output unit 95 configured to output a serialized file for the target group node according to the first file and the second file.

As an optional implementation of the embodiment of the present invention, the node processing unit 93 is specifically configured to construct the node tree according to the target group node, the nodes in the node group and the grouping information the group nodes in the node group, and generate the first file according to the node tree;

Wherein, the root node of the node tree is the target group node, other nodes of the node tree are the nodes in the node group respectively, and any group node is a parent node of nodes in a node group corresponding to the group node;

As an optional implementation of the embodiment of the present invention, the node processing unit 93 is specifically configured to serialize nodes of the node tree to generate serialized file for the nodes of the node tree; save the serialized file for the root node of the node tree as a root file for the first file, and save the serialized file for child nodes of the node tree level by level as child files for the serialized file for the parent node.

As an optional implementation of the embodiment of the present invention, the connection processing unit 94 is specifically configured to acquire ports corresponding to individual connection lines, and ports corresponding to any connection line including ports connected to both ends of the connection line; serialize the ports corresponding to individual connection lines to generate serialized files for individual connection lines; generate the second file according to the serialized files for individual connection lines.

Figure 10:
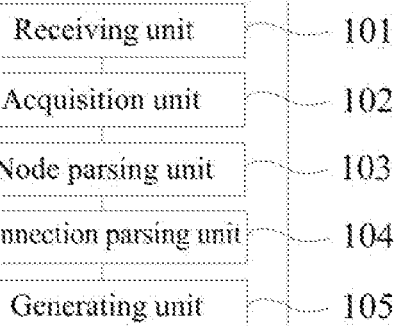
FIG. 10 is a schematic structural diagram of an apparatus for importing a group node provided by an embodiment of the present invention.

An embodiment of the present invention provides an apparatus for editing group nodes. FIG. 10 is a schematic structural diagram of the apparatus for importing a group node. As shown in FIG. 10, the apparatus for importing a group node 100 comprises:
- a receiving unit 101 configured to receive an importing request, where the importing request is used to request to import a target group node;
- an acquisition unit 102 configured to acquire a serialized file for the target group node, the serialized file for the target group node including: a first file and a second file;
- a node parsing unit 103 configured to parse the first file to acquire the target group node, nodes in a node group corresponding to the target group node, and grouping information of group nodes in the node group;
- a connection parsing unit 104 configured to parse the second file to acquire connection lines between nodes in the node group;
- a generating unit 105 configured to construct the target group node and the node group corresponding to the target group node according to the target group node, the nodes in the node group, the grouping information of the group nodes in the node group and the connection lines between the nodes in the node group.

As an optional implementation of the embodiment of the present invention, the node parsing unit 103 is specifically configured to parse the first file to acquire a node tree; acquire the target group node according to the root node of the node tree; acquire nodes in the node group according to other nodes in the node tree; acquire the grouping information of the group nodes in the node group according to the parent-child relationships between the nodes of the node tree.

As an optional implementation of the embodiment of the present invention, the node parsing unit 103 is specifically configured to parse the first file to acquire serialized files for individual nodes; de-serialize the serialized files for individual nodes to generate nodes corresponding to individual serialized files; save a node corresponding to the root file for the first file as the root node of the node tree, and save nodes corresponding to child files for the first file level by level as child nodes of the node corresponding to the parent file.

As an optional implementation of the embodiment of the present invention, the connection parsing unit 104 is specifically configured to parse the second file to acquire serialized files for individual connection lines, and de-serialize the serialized files for individual connection lines to generate ports corresponding to individual connection lines;
   wherein ports corresponding to any connection line includes ports connected to both ends of the connection line.

The apparatus for editing group nodes provided in the embodiment can execute the method for exporting a group node provided by the foregoing method embodiment, and implementation principles and technical effects thereof are similar, and will not be repeated herein.

Figure 11:
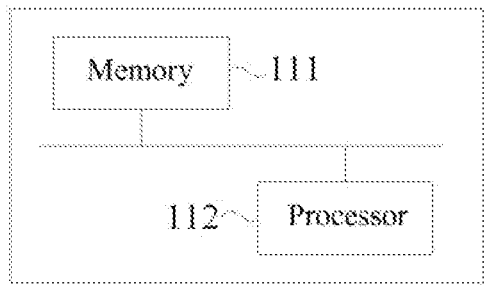
FIG. 11 is a schematic diagram of a hardware structure of an electronic device provided by an embodiment of the present invention.

Based on the same inventive concept, an embodiment of the present invention further provides an electronic device. FIG. 11 is a schematic structural diagram of an electronic device provided by an embodiment of the present invention. As shown in FIG. 11, the electronic device provided by the embodiment comprises: a memory 111 and a processor 112, where the memory 111 is configured to store a computer program; the processor 112 is configured to, when the computer program is invoked, execute the method provided by any of above embodiments.

Based on the same inventive concept, an embodiment of the present invention further provides a computer-readable storage medium having a computer program stored thereon, which, when executed by a processor, causes the computing device to implement the method provided by any of above embodiments.

Based on the same inventive concept, an embodiment of the present invention further provides a computer program product, which, when runs on a computer, causes the computing device to implement the method provided by any of above embodiments.

As will be appreciated by those skilled in the art, embodiments of the present invention may be provided as a method, system, or computer program product. Accordingly, the present invention may take the form of an entirely hardware embodiment, an entirely software embodiment, or an embodiment combining software and hardware aspects. Furthermore, the present invention may take the form of a computer program product embodied on one or more computer-usable storage media having computer-usable program code contained therein.

The processor may be a Central Processing Unit (CPU), other general-purpose processor, a Digital Signal Processor (DSP), an Application Specific Integrated Circuit (ASIC), a Field-Programmable Gate Array (FPGA) or other programmable logic devices, discrete gate or transistor logic devices, discrete hardware components, etc. A general purpose processor may be a microprocessor or the processor may be any conventional processor or the like.

The memory may include the form of a non-persistent memory in a computer readable medium, a random access memory (RAM) and/or non-volatile memory, for example, a read only memory (ROM) or a flash RAM. The memory is an example of a computer-readable medium.

The computer readable media includes persistent and non-persistent, removable and non-removable storage media. A storage medium can be implemented by any method or technology for storage of information, and the information can be computer readable instructions, data structures, units of programs, or other data. Examples of computer storage media include, but not limited to, a Phase-Change Memory (PRAM), a Static Random Access Memory (SRAM), a Dynamic Random Access Memory (DRAM), other types of Random Access Memory (RAM), a Read Only Memory (ROM), an Electrically Erasable Programmable Read Only Memory (EEPROM), a Flash Memory or other memory technology, a Compact Disc Read Only Memory (CD-ROM), Digital Versatile Disc (DVD) or other optical storage, magnetic tape cartridges, magnetic disk storage or other magnetic storage devices or any other non-transmission medium, which can be used to store information that can be accessed by a computing device. Computer-readable media, as defined herein, excludes transitory computer-readable media, such as modulated data signals and carrier waves.

Finally, it should be noted that above embodiments are only used to illustrate the technical solutions of the present invention, but not to limit them; although the present invention has been described in detail with reference to the foregoing embodiments, those of ordinary skilled in the art should understand that: the technical solutions recited in the foregoing embodiments can still be modified, or some or all of the technical features thereof can be equivalently substitute; and these modifications or substitutions do not make the essence of the corresponding technical solutions deviate from the range of the technical solutions of the embodiments of the present invention.

What is claimed is:

1. A method for exporting a group node, comprising:
receiving an exporting request, the exporting request is used to request to export a target group node;
recursively acquiring nodes in a node group corresponding to the target group node and connection lines between the nodes in the node group;
generating a first file according to the target group node, the nodes in the node group, and grouping information of group nodes in the node group;
acquiring ports corresponding to individual connection lines, wherein ports corresponding to any connection line includes ports connected to both ends of the connection line;
serializing the ports corresponding to the individual connection lines to generate serialized files for the individual connection lines;
generating a second file according to the serialized files for the individual connection lines; and
outputting a serialized file for the target group node according to the first file and the second file.

2. The method according to claim 1, wherein the generating the first file according to the target group node, the nodes in the node group, and grouping information of the group nodes in the node group comprises:
constructing a node tree according to the target group node, the nodes in the node group and the grouping information of the group nodes in the node group; wherein a root node of the node tree is the target group node, other nodes of the node tree are the nodes in the node group respectively, and any group node is a parent node of nodes in a node group corresponding to the group node; and
generating the first file according to the node tree.

3. The method according to claim 2, wherein the generating the first file according to the node tree comprises:
serializing nodes of the node tree to generate a serialized file files for the nodes of the node tree;
saving a serialized file for the root node of the node tree as a root file for the first file, and saving serialized files for child nodes of the node tree level-by-level as child files for the serialized file for the parent node.

4. A non-transitory computer-readable storage medium, the non-transitory computer-readable storage medium having a computer program stored thereon, which, when executed by a computing device, causes the computing device to implement the method according to claim 1.

5. A method for importing a group node, comprising:
receiving an importing request, the importing request is used to request to import a target group node;
acquiring a serialized file for the target group node, the serialized file for the target group node including: a first file and a second file;

parsing the first file to acquire the target group node, nodes in a node group corresponding to the target group node, and grouping information of group nodes in the node group;

parsing the second file to acquire serialized files for individual connection lines;

de-serializing the serialized files for the individual connection lines to generate ports corresponding to the individual connection lines; wherein ports corresponding to any connection line includes ports connected to both ends of the connection line; and constructing the target group node and the node group corresponding to the target group node according to the target group node, the nodes in the node group, the grouping information of the group nodes in the node group and connection lines between the nodes in the node group.

6. The method according to claim 5, wherein the parsing the first file to acquire the target group node, nodes in the node group corresponding to the target group node, and the grouping information of group nodes in the node group comprises:

parsing the first file to acquire a node tree;

acquiring the target group node according to a root node of the node tree;

acquiring nodes in the node group according to other nodes in the node tree; and acquiring the grouping information of the group nodes in the node group according to parent-child relationships between the nodes of the node tree.

7. The method according to claim 6, wherein the parsing the first file to acquire the node tree comprises:

parsing the first file to acquire serialized files for individual nodes;

de-serializing the serialized files for individual nodes to generate nodes corresponding to individual serialized files; and saving a node corresponding to a root file for the first file as the root node of the node tree, and saving nodes corresponding to child files for the first file level-by-level as child nodes of a node corresponding to a parent file.

8. An electronic device, comprising: a memory and a processor, wherein the memory is storing a computer program; the processor is configured to, when the computer program is executed, cause the electronic device to implement a method for exporting a group node, the method comprising:

receiving an exporting request, the exporting request is used to request to export a target group node;

recursively acquiring nodes in a node group corresponding to the target group node and connection lines between the nodes in the node group;

generating a first file according to the target group node, the nodes in the node group, and grouping information of group nodes in the node group;

acquiring ports corresponding to individual connection lines, wherein ports corresponding to any connection line includes ports connected to both ends of the connection line;

serializing the ports corresponding to the individual connection lines to generate serialized files for the individual connection lines;

generating a second file according to the serialized files for the individual connection lines; and outputting a serialized file for the target group node according to the first file and the second file.

9. The electronic device according to claim 8, wherein the processor is configured to, when the computer program is executed, cause the electronic device to implement the method further comprising:

constructing a node tree according to the target group node, the nodes in the node group and the grouping information of the group nodes in the node group; wherein a root node of the node tree is the target group node, other nodes of the node tree are the nodes in the node group respectively, and any group node is a parent node of nodes in a node group corresponding to the group node; and generating the first file according to the node tree.

10. The electronic device according to claim 9, wherein the processor is configured to, when the computer program is executed, cause the electronic device to implement the method further comprising:

serializing nodes of the node tree to generate a serialized file files for the nodes of the node tree;

saving the serialized file for the root node of the node tree as a root file for the first file, and saving serialized files for child nodes of the node tree level-by-level as child files for the serialized file for the parent node.

11. An electronic device, comprising: a memory and a processor, wherein the memory is storing configured to store a computer program; the processor is configured to, when the computer program is executed, cause the electronic device to implement a method for importing a group node, the method comprising:

receiving an importing request, the importing request is used to request to import a target group node;

acquiring a serialized file for the target group node, the serialized file for the target group node including: a first file and a second file;

parsing the first file to acquire the target group node, nodes in a node group corresponding to the target group node, and grouping information of group nodes in the node group;

parsing the second file to acquire serialized files for individual connection lines;

de-serializing the serialized files for the individual connection lines to generate ports corresponding to the individual connection lines; wherein ports corresponding to any connection line includes ports connected to both ends of the connection line; and constructing the target group node and the node group corresponding to the target group node according to the target group node, the nodes in the node group, the grouping information of the group nodes in the node group and connection lines between the nodes in the node group.

12. The electronic device according to claim 11, wherein the processor is configured to, when the computer program is executed, cause the electronic device to implement the method further comprising:

parsing the first file to acquire a node tree;

acquiring the target group node according to a root node of the node tree;

acquiring nodes in the node group according to other nodes in the node tree; and acquiring the grouping information of the group nodes in the node group according to parent-child relationships between the nodes of the node tree.

13. The electronic device according to claim 12, wherein the processor is configured to, when the computer program is executed, cause the electronic device to implement the method further comprising:

parsing the first file to acquire serialized files for individual nodes;
de-serializing the serialized files for individual nodes to generate nodes corresponding to individual serialized files; and
saving a node corresponding to a root file for the first file as the root node of the node tree, and saving nodes corresponding to child files for the first file level-by-level as child nodes of a node corresponding to a parent file.

* * * * *